US012625069B2

(12) United States Patent
    Asano

(10) Patent No.: US 12,625,069 B2
(45) Date of Patent: May 12, 2026

(54) GAS CONCENTRATION MEASURING DEVICE, GAS CONCENTRATION MEASURING METHOD, AND PROGRAM

(71) Applicant: Konica Minolta, Inc., Tokyo (JP)

(72) Inventor: Motohiro Asano, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 184 days.

(21) Appl. No.: 18/710,927

(22) PCT Filed: Aug. 23, 2022

(86) PCT No.: PCT/JP2022/031650
    § 371 (c)(1),
    (2) Date: May 16, 2024

(87) PCT Pub. No.: WO2023/105856
    PCT Pub. Date: Jun. 15, 2023

(65) Prior Publication Data
    US 2025/0362226 A1     Nov. 27, 2025

(30) Foreign Application Priority Data
    Dec. 10, 2021     (JP) ................................. 2021-200885

(51) Int. Cl.
    *G01N 21/3504*        (2014.01)
    *G01M 3/00*           (2006.01)
    (Continued)

(52) U.S. Cl.
    CPC ........ *G01N 21/3504* (2013.01); *G01M 3/002* (2013.01); *G01M 3/38* (2013.01);
    (Continued)

(58) Field of Classification Search
    CPC ............... G01N 21/3504; G01N 25/72; G01N 33/0034; G01M 3/002; G01M 3/38;
    (Continued)

(56) References Cited

U.S. PATENT DOCUMENTS

| | | | | |
|---|---|---|---|---|
| 2014/0008526 A1* | 1/2014 | Zeng | ....................... | G01M 3/38 |
| | | | | 250/252.1 |
| 2019/0003919 A1 | 1/2019 | Asano et al. | | |
| 2019/0162657 A1* | 5/2019 | Wang | ....................... | G01M 3/38 |

FOREIGN PATENT DOCUMENTS

| | | |
|---|---|---|
| JP | 2019066465 A | 4/2019 |
| WO | 2017073430 A1 | 5/2017 |
| WO | 2017104617 A1 | 6/2017 |

OTHER PUBLICATIONS

Extended European Search Report (EESR) dated Apr. 17, 2025 for European Patent Application No. 22903791.6.
(Continued)

*Primary Examiner* — Courtney D Thomas
(74) *Attorney, Agent, or Firm* — RANKIN, HILL & CLARK LLP

(57)        ABSTRACT

To accurately estimate a feature quantity related to a gas concentration and accurately measure a gas concentration in a space even in a case where a background temperature changes due to a factor other than gas.
A gas concentration measuring device 20 includes an inspection image acquisition unit 211 that acquires infrared image time-series data captured by an infrared camera 10, a pixel specifying unit 2121 that specifies a target pixel for gas concentration measurement and a reference pixel with a gas concentration lower than a gas concentration of the target pixel in the infrared image, a without-gas background temperature estimation unit 2122 that estimates without-gas background temperature time-series infrared data in the target pixel based on target pixel time-series infrared data and reference pixel time-series infrared data in time-series data of the infrared image, and a concentration-feature-quantity calculation unit 2123 that calculates time-series data of a feature quantity related to a gas concentration of the target pixel based on the target pixel time-series infrared (Continued)

data and without-gas background temperature time-series infrared data of the target pixel.

19 Claims, 15 Drawing Sheets

(51) Int. Cl.

| | |
|---|---|
| *G01M 3/38* | (2006.01) |
| *G06T 7/00* | (2017.01) |
| *G06T 7/246* | (2017.01) |
| *G06V 10/62* | (2022.01) |
| *G06V 20/52* | (2022.01) |

(52) U.S. Cl.
CPC ............ *G06T 7/0002* (2013.01); *G06T 7/246* (2017.01); *G06V 10/62* (2022.01); *G06V 20/52* (2022.01); *G06T 2207/10016* (2013.01); *G06T 2207/10048* (2013.01)

(58) Field of Classification Search
CPC ........ G01M 3/22; G06T 7/0002; G06T 7/246; G06T 2207/10016; G06T 2207/10048; G06T 7/0004; G06V 10/62; G06V 20/52; G06V 10/143; G01J 2005/0077; G01J 5/0014; G01J 5/026; G01J 5/48
See application file for complete search history.

(56) References Cited

OTHER PUBLICATIONS

International Search Report dated Oct. 25, 2022 filed in PCT/JP2022/031650; English translation.
Written Opinion of the International Searching Authority dated Oct. 25, 2022 filed in PCT/JP2022/031650; English translation.
Japanese Office Action (JPOA) dated Jan. 6, 2026 for Japanese Patent Application No. 2023-566091; English machine translation.

* cited by examiner

CAPTURED IMAGE

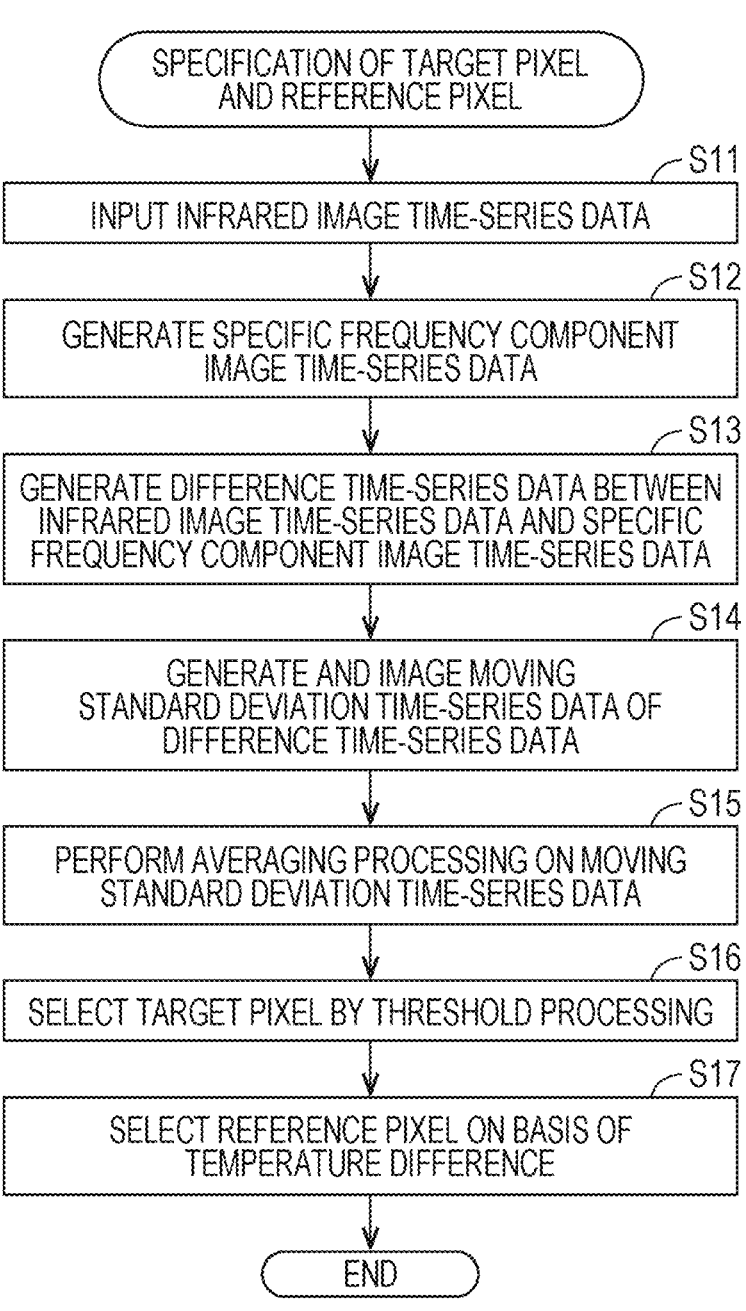

SPECIFICATION OF TARGET PIXEL
AND REFERENCE PIXEL

S11
INPUT INFRARED IMAGE TIME-SERIES DATA

S12
GENERATE SPECIFIC FREQUENCY COMPONENT
IMAGE TIME-SERIES DATA

S13
GENERATE DIFFERENCE TIME-SERIES DATA BETWEEN
INFRARED IMAGE TIME-SERIES DATA AND SPECIFIC
FREQUENCY COMPONENT IMAGE TIME-SERIES DATA

S14
GENERATE AND IMAGE MOVING
STANDARD DEVIATION TIME-SERIES DATA OF
DIFFERENCE TIME-SERIES DATA

S15
PERFORM AVERAGING PROCESSING ON MOVING
STANDARD DEVIATION TIME-SERIES DATA

S16
SELECT TARGET PIXEL BY THRESHOLD PROCESSING

S17
SELECT REFERENCE PIXEL ON BASIS OF
TEMPERATURE DIFFERENCE

END

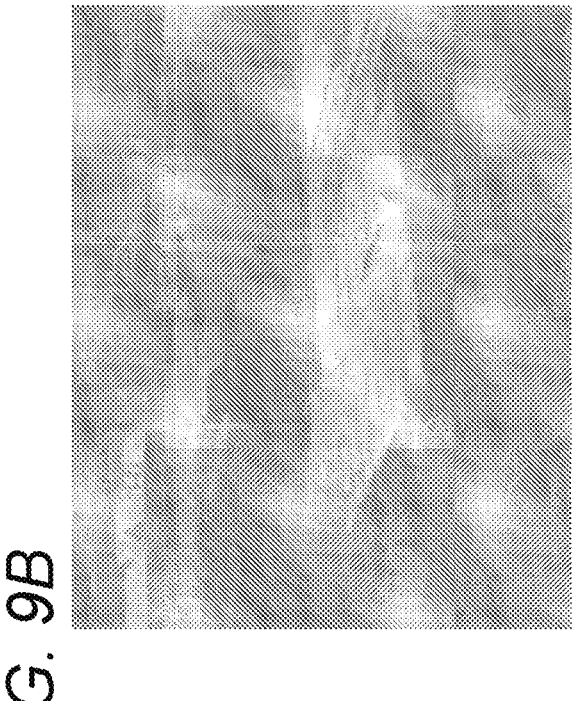
FIG. 9B
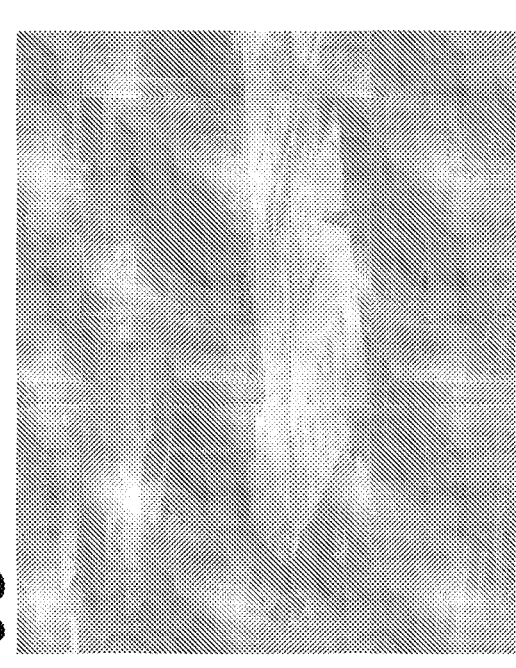
FIG. 9D
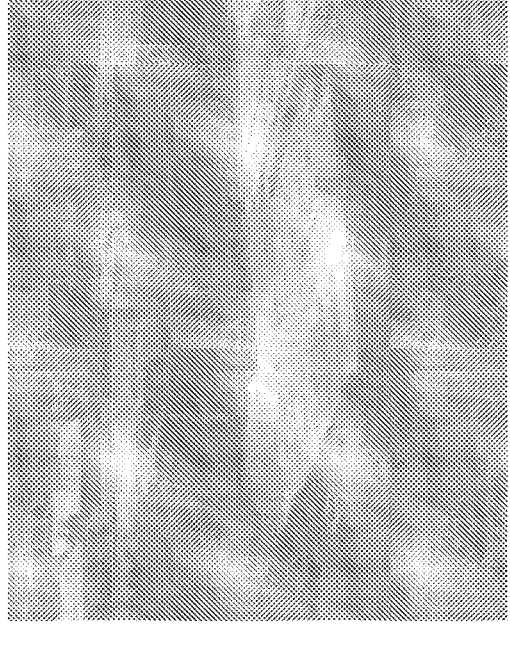
FIG. 9A
FIG. 9C

FIG. 10A

GAS CLOUD

FIG. 10B

GAS CLOUD

FIG. 10C

GAS CLOUD

FIG. 10D

GAS CLOUD

FIG. 11

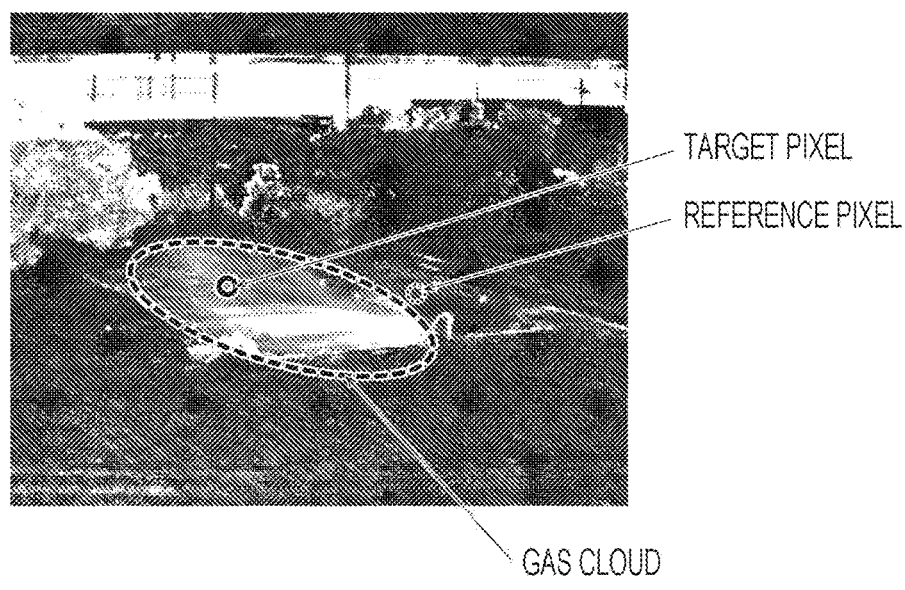

TARGET PIXEL

REFERENCE PIXEL

GAS CLOUD

FIG. 12

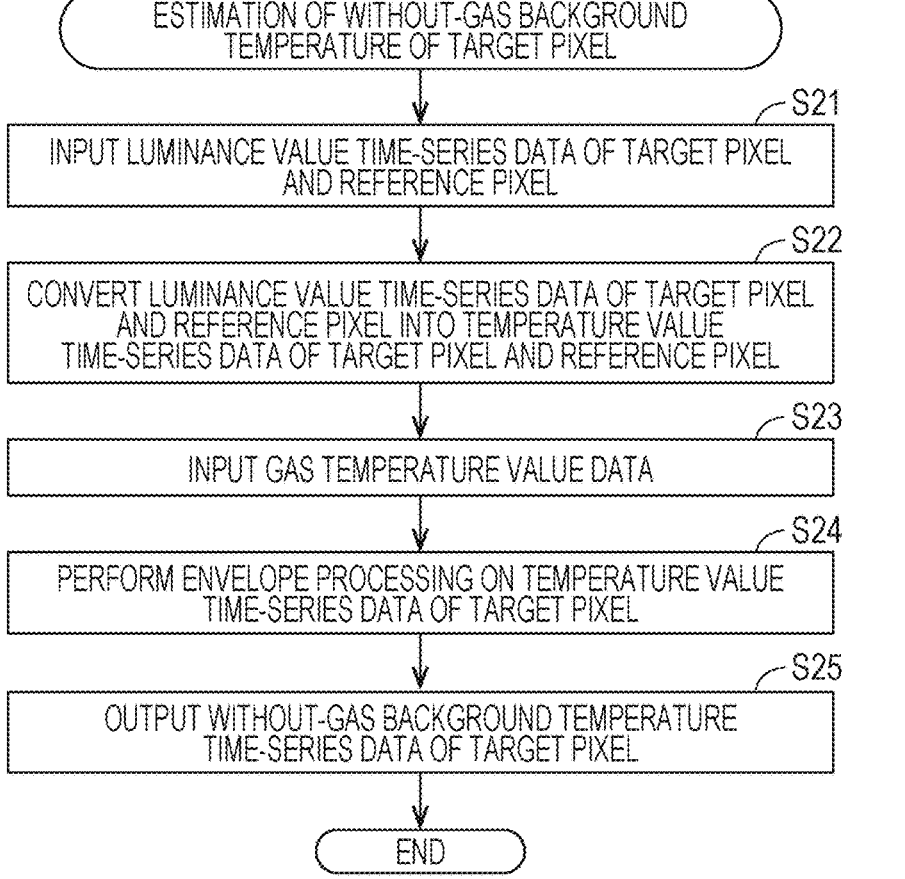

ESTIMATION OF WITHOUT-GAS BACKGROUND
TEMPERATURE OF TARGET PIXEL

S21

INPUT LUMINANCE VALUE TIME-SERIES DATA OF TARGET PIXEL
AND REFERENCE PIXEL

S22

CONVERT LUMINANCE VALUE TIME-SERIES DATA OF TARGET PIXEL
AND REFERENCE PIXEL INTO TEMPERATURE VALUE
TIME-SERIES DATA OF TARGET PIXEL AND REFERENCE PIXEL

S23

INPUT GAS TEMPERATURE VALUE DATA

S24

PERFORM ENVELOPE PROCESSING ON TEMPERATURE VALUE
TIME-SERIES DATA OF TARGET PIXEL

S25

OUTPUT WITHOUT-GAS BACKGROUND TEMPERATURE
TIME-SERIES DATA OF TARGET PIXEL

END

WITH-GAS BACKGROUND TEMPERATURE

DATA DT I (x, y)

WITHOUT-GAS BACKGROUND TEMPERATURE

DATA (DTIback)

LIGHT ABSORPTION RATE IMAGE DATA DT α (x, y)

1

GAS CONCENTRATION MEASURING DEVICE, GAS CONCENTRATION MEASURING METHOD, AND PROGRAM

TECHNICAL FIELD

The present disclosure relates to a gas concentration measuring device, a gas concentration measuring method, and a program, and relates to gas concentration measurement using an infrared captured image.

BACKGROUND ART

In facilities that use gases (hereinafter, also referred to as "gas facilities"), such as production facilities that produce natural gas and oil, production plants that produce chemical products using gases, gas pipe transmission facilities, petrochemical plants, thermal power plants, and iron and steel facilities, risks of gas leakage due to aged deterioration and operational errors of the facilities have been recognized, and a gas detection device is provided to minimize the gas leakage.

Regarding the gas detection, in addition to a gas detection device using a fact that electrical characteristics of a detection probe are changed by contact of gas molecules with the detection probe, an optical gas leakage detection method has been adopted in which an infrared moving image is captured using infrared absorption characteristics of gas to detect gas leakage in an inspection region in recent years.

Since the gas detection method by the infrared moving image can visualize the gas by the image, the method has an advantage that an emission state of a flow of the gas or the like and a leakage position can be easily detected as compared with the conventional detection probe method. In addition, since the state of the leaked gas is recorded as the image, the method has an advantage that the image can be used as evidence of occurrence of gas leakage and restoration thereof.

As this type of infrared gas detection device, for example, Patent Literature 1 discloses a technique of estimating a concentration length product by specifying a background temperature when gas is present and the background temperature when gas is not present by detecting an amplitude characteristic in a time-series luminance change for each pixel to be inspected in an infrared image obtained by capturing a monitoring target. This technique uses the fact that with-gas data and without-gas data is captured when the pixels to be inspected are viewed in time series due to the property of gas fluctuation.

CITATION LIST

Patent Literature

Patent Literature 1: WO 2017/104617 A1

SUMMARY OF INVENTION

Technical Problem

However, in the measurement device described in Patent Literature 1, for example, when the background temperature changes due to factors other than gas, such as the influence of the cloud, the temperature change due to the gas may be smaller than the change in the background temperature, and there is a problem that it is difficult to accurately estimate the feature quantity related to the gas concentration such as the concentration length product and accurately measure the gas concentration in the space.

An aspect of the present disclosure has been made in view of the above problems, and an object of the present disclosure is to provide a gas concentration measuring device, a gas concentration measuring method, and a program capable of accurately measuring a gas concentration in a space from an infrared moving image even in a case where a background temperature changes due to a factor other than gas.

Solution to Problem

A gas concentration measuring device according to one aspect of the present disclosure is a gas concentration measuring device that measures a distribution of a gas concentration in a space exposed from a gas leakage monitoring target, the gas concentration measuring device including an inspection image acquisition unit that acquires infrared image time-series data in which infrared images captured by an infrared camera at a plurality of times and capturing the space constituted by a plurality of pixels are arranged in time series, a pixel specifying unit that specifies a target pixel for gas concentration measurement and a reference pixel with a gas concentration lower than a gas concentration of the target pixel in the gas cloud image, a without-gas background temperature estimation unit that estimates without-gas background temperature time-series infrared data in the target pixel based on target pixel time-series infrared data in which infrared data of the target pixel is arranged in time series and reference pixel time-series infrared data in which infrared data of the reference pixel is arranged in time series in time-series data of the infrared image, and a concentration-feature-quantity calculation unit that calculates time-series data of a feature quantity related to a gas concentration of the target pixel based on the target pixel time-series infrared data and without-gas background temperature time-series infrared data of the target pixel.

Advantageous Effects of Invention

According to the gas concentration measuring device, the gas concentration measuring method, and the program of one aspect of the present disclosure, it is possible to more accurately estimate the background temperature when gas is not present by reducing the influence of a change in the background temperature due to a factor other than the gas. Therefore, even in a case where the background temperature changes due to a factor other than the gas, the gas concentration in the space can be accurately measured from the infrared moving image.

BRIEF DESCRIPTION OF DRAWINGS

FIG. 6 is a functional block diagram of a control unit 21.

FIG. 8 is a flowchart illustrating an operation of specifying a target pixel and a reference pixel in step S1 in FIG. 7.

FIGS. 9(*a*) to 9(*d*) are examples of images of a plurality of frames arranged in time series based on infrared image time-series data.

FIGS. 10(*a*) to 10(*d*) are examples of images of a plurality of frames arranged in time series based on time-series data of a gas cloud image.

FIG. 11 illustrates an image obtained by averaging gas cloud images of the plurality of frames illustrated in FIGS. 10(*a*) to 10(*d*).

FIG. 12 is a flowchart illustrating an operation of estimating a without-gas background temperature of the target pixel in step S2 in FIG. 7.

DESCRIPTION OF EMBODIMENTS

Embodiment

An embodiment of the present disclosure is implemented as a gas concentration measuring system 1 including an infrared camera 10 and a gas concentration measuring device, the gas concentration measuring system analyzing gas leakage from an inspection image to be inspected for gas leakage in a gas facility.

Figure 1:
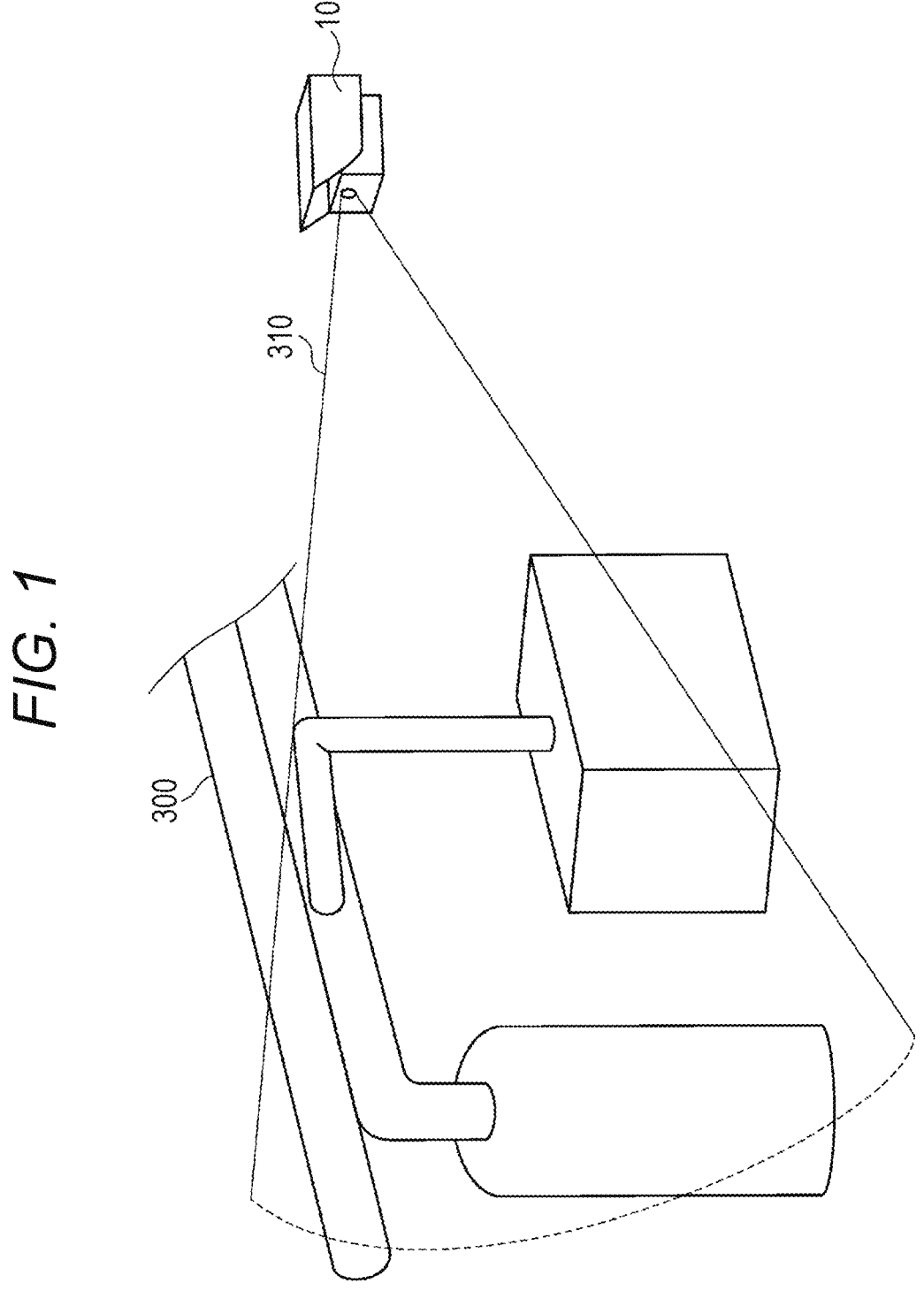
FIG. 1 is a schematic diagram illustrating a relationship between an infrared camera 10 and an inspection object 300.

FIG. 1 is a schematic diagram illustrating a relationship between the infrared camera 10 and an inspection object 300. As illustrated in FIG. 1, the infrared camera 10 is installed in a manner that the inspection object 300 is included in a visual field range 310 of the infrared camera.

The infrared camera 10 converts a captured image into a predetermined video signal. In the present embodiment, the infrared image signal acquired by the infrared camera is processed as a moving image including a plurality of frames by restoring the video signal to an image. The acquired infrared image is, for example, a video signal for transmitting an image of 30 frames per second. In the gas concentration measuring system 1, the infrared moving image is supplied as inspection target data from the infrared camera 10 to a gas concentration measuring device.

Figure 2:
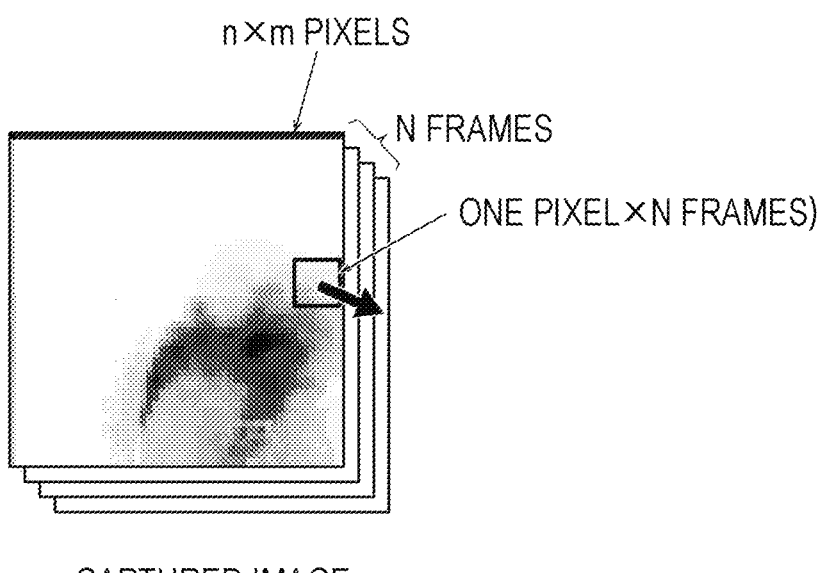
FIG. 2 is a schematic diagram illustrating a mode of time-series pixel data of infrared data regionally extracted from inspection data of an infrared moving image.

FIG. 2 is a schematic diagram illustrating a mode of time-series pixel data of infrared data regionally extracted from inspection target data of an infrared moving image. The image is an infrared moving image of a monitoring target, and has an intensity of infrared light as a pixel value. When the size of the infrared moving image or the number of frames as a moving image is excessively large, the amount of calculation in measurement increases. In the embodiment, the number of pixels (n×m) of the infrared image may be, for example, 320×256 pixels, and the number of frames (N) may be, for example, 100.

<Configuration of Gas Concentration Measuring System 1>

The gas concentration measuring system 1 is a device or a system that captures a monitoring target using infrared rays and provides an infrared image in which gas is visualized, and includes, for example, an imaging unit including the infrared camera 10 that detects and captures infrared rays, and an interface circuit that outputs the image to a communication network N. Examples of the gas concentration measuring system 1 include an installation type in which an infrared camera is installed in a gas facility or the like, a portable type in which an inspector can carry the infrared camera, and a type in which the infrared camera is mounted on a drone.

The gas concentration measuring system 1 according to the embodiment will be described in detail below with reference to the drawings.

Figure 3:
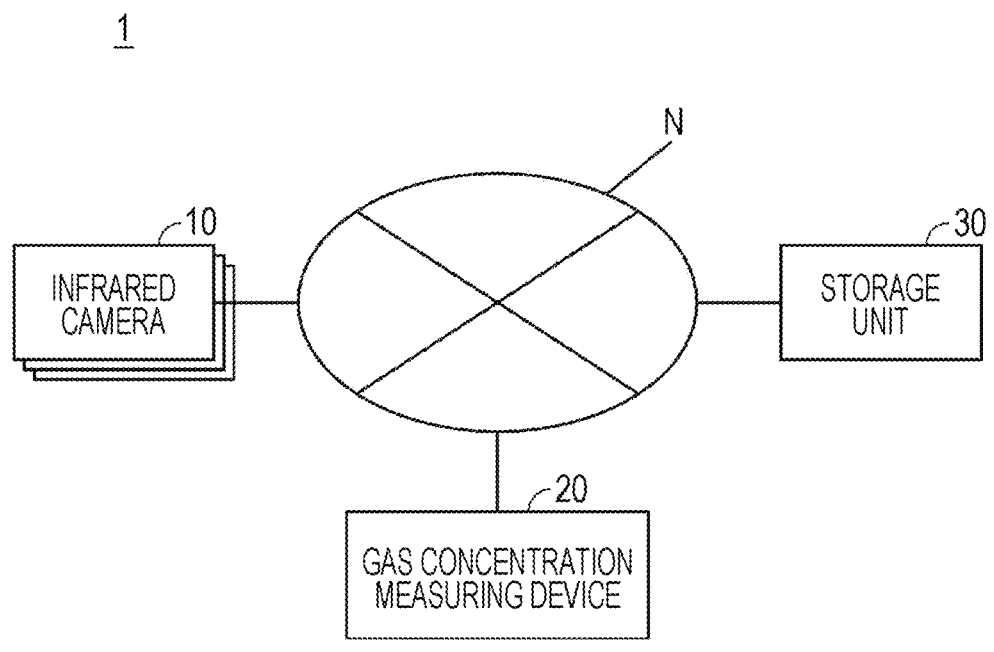
FIG. 3 is a schematic configuration diagram of a gas concentration measuring system 1 according to an embodiment.

FIG. 3 is a schematic configuration diagram of the gas concentration measuring system 1 according to the embodiment. As illustrated in FIG. 3, the gas concentration measuring system 1 includes a plurality of the infrared cameras 10, a gas concentration measuring device 20, and a storage unit 30 connected to the communication network N.

The communication network N is, for example, the Internet, and the infrared camera 10, the gas concentration measuring device 20, and the storage unit 30 are connected thereto so as to be able to exchange information with each other.

<Configuration of Each Unit>

The infrared camera 10 is an infrared imaging device that generates an infrared image on the basis of infrared light and outputs the infrared image to the outside.

Figure 4:
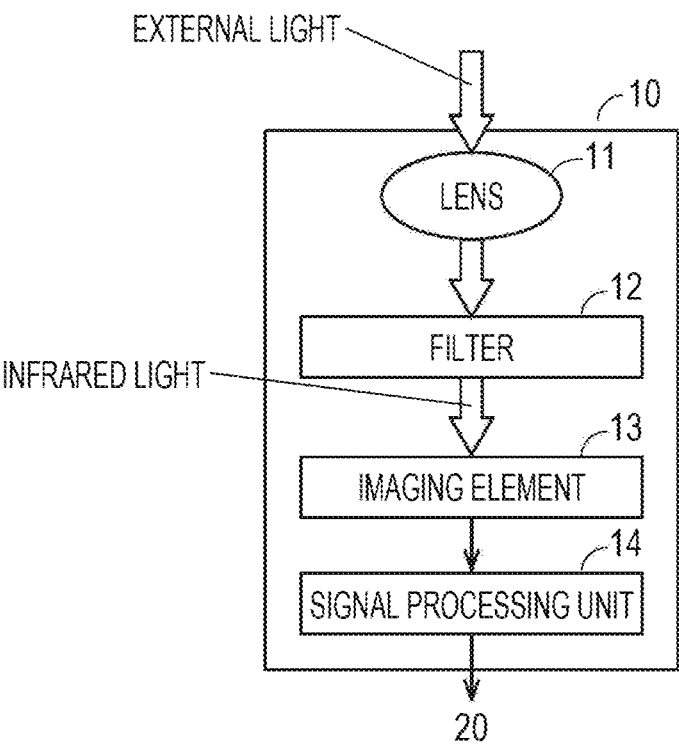
FIG. 4 is a diagram illustrating a configuration of the infrared camera 10.

FIG. 4 is a schematic configuration diagram illustrating an example of a configuration of the infrared camera 10. As illustrated in FIG. 4, the infrared camera 10 includes a lens 11 that condenses external light, a filter 12 that passes only infrared light in a specific wavelength band including an absorption wavelength of detection target gas, an imaging element 13 that receives infrared light and converts the infrared light into an electrical signal, and a signal processing unit 14.

An image by the infrared camera is generally used for detecting a hydrocarbon-based gas. For example, so-called infrared camera is provided with an image sensor having a sensitivity wavelength band in at least a part of an infrared light wavelength of 3 μm to 5 μm, and can detect hydrocarbon-based gases such as methane, ethane, ethylene, and propylene by detecting and imaging infrared light having a wavelength of, for example, 3.2 to 3.4 μm.

Alternatively, different types of gases such as carbon monoxide can be detected by using infrared light having a wavelength of 4.52 to 4.67 μm.

The infrared camera 10 detects the presence of gas by capturing a change in the amount of electromagnetic wave emitted from a background object having an absolute temperature of 0 (K) or more. The change in the amount of electromagnetic wave is mainly caused by the absorption of electromagnetic wave in an infrared region by the gas or generation of blackbody radiation from the gas itself. Since the gas leakage can be captured as an image by capturing the space to be monitored, the gas leakage can be detected at an earlier stage, and the location of the gas can be accurately captured.

The infrared image (inspection image) is temporarily stored in a memory or the like, transferred to the storage unit 30 via the communication network N on the basis of an operation input, and stored.

The storage unit 30 is a storage device that stores the infrared images transmitted from the infrared camera 10, includes a nonvolatile memory such as a hard disk, and stores the infrared images in association with the identification information of the infrared camera 10. The administrator can read the infrared image from the storage unit 30 using a management terminal (not illustrated) or the like and grasp the state of the infrared image to be browsed.

The gas concentration measuring device 20 is a device that acquires an infrared image in which the monitoring target is captured from the infrared camera 10, estimates a feature quantity (hereinafter, may be referred to as "gas concentration feature quantity") related to the gas concentration on the basis of the infrared image, and notifies a user of gas detection through a display 24. Examples of the gas concentration feature quantity include a concentration length product and a light absorption rate.

(Configuration of Gas Concentration Measuring Device 20)

The gas concentration measuring device 20 is implemented, for example, as a general computer including a central processing unit (CPU), a random access memory (RAM), and a program executed by them. As described later, the gas concentration measuring device 20 may further include a graphics processing unit (GPU) as a calculation device and a RAM.

Figure 5:
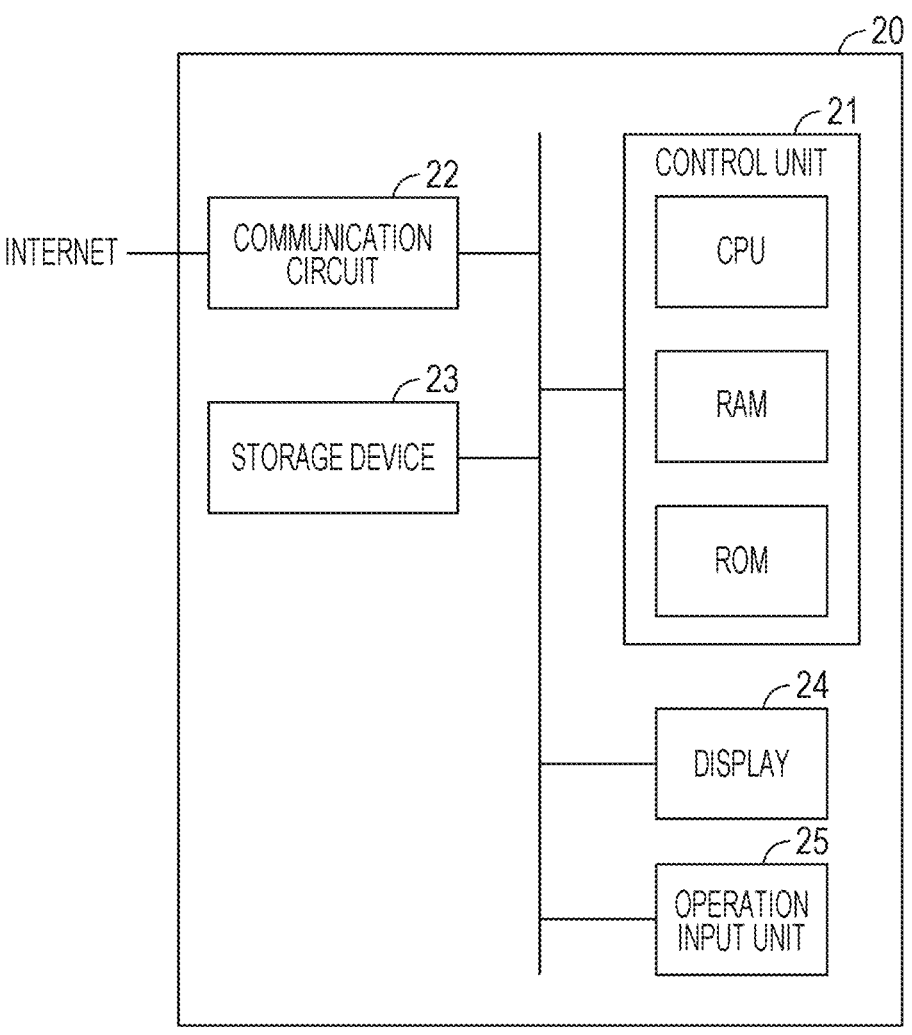
FIG. 5 is a diagram illustrating a circuit configuration of a gas concentration measuring device 20.

The following will describe a configuration of the gas concentration measuring device 20. FIG. 5 is a diagram illustrating a circuit configuration of the gas concentration measuring device 20.

The gas concentration measuring device 20 is a server computer for estimating a gas concentration feature quantity on the basis of an infrared image input as an inspection image to be inspected. The gas concentration measuring device 20 reads the infrared image stored in the storage unit 30, or receives the acquired infrared image from the infrared camera 10, estimates, for example, the concentration length product of the infrared image to generate a concentration length product image, outputs the concentration length product image to the storage unit 30 via the communication network N, and stores the concentration length product image. Alternatively, the light absorption rate image may be generated by estimating the light absorption rate product of the infrared image.

FIG. 3 is a schematic configuration diagram illustrating a circuit configuration of the gas concentration measuring device 20. As illustrated in FIG. 3, the gas concentration measuring device 20 includes a control unit 21, a communication circuit 22, a storage device 23, the display 24, and an operation input unit 25.

The communication circuit 22 is a circuit that acquires a gas-distribution moving image from the infrared camera 10. The device that captures image data into a processing device such as a computer, for example an image capture board, can be used.

The storage device 23 is a storage unit that temporarily stores the infrared image transmitted from the infrared camera 10, includes, for example, a semiconductor memory, and stores the infrared image until the gas concentration feature quantity is calculated.

The display 24 is, for example, a liquid crystal panel or the like, and displays a screen generated by the control unit 21.

The operation input unit 25 is an input device that accepts an input by the operator to operate the gas concentration measuring device 20. For example, the operation input unit may be implemented as an input device such as a keyboard and a mouse, or as one device that functions as a display device and an input device such as a touch panel in which a touch sensor is disposed on the front surface of the display 24.

The control unit 21 includes a CPU, a RAM, and a ROM, and the CPU executes a program (not illustrated) stored in the ROM to implement each function of the gas concentration measuring device 20. Specifically, the control unit 21 estimates the gas concentration of the gas-distribution image on the basis of the infrared image acquired from the communication circuit 22, creates a distribution image of the gas concentration feature quantity, and outputs the image for gas concentration measurement to the communication circuit 22. Specifically, as the gas concentration measurement, a light absorption rate image or a gas concentration length product image is created by estimating a light absorption rate or a gas concentration length product, and is output to the communication circuit 22.

(Function of Control Unit 21)

Figure 6:
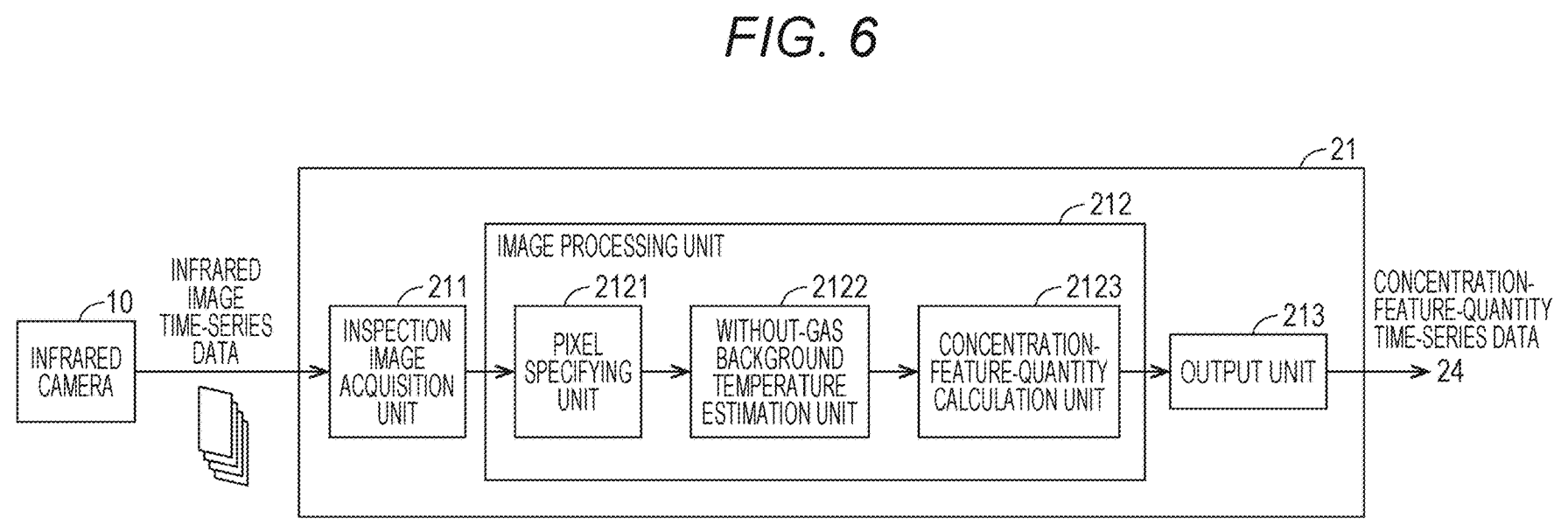

FIG. 6 is a functional block diagram of the control unit 21. As illustrated in FIG. 6, the gas concentration measuring device 20 includes an inspection image acquisition unit 211, an image processing unit 212, and an output unit 213.

The inspection image acquisition unit 211 is a circuit that acquires, from the communication circuit 22, infrared image time-series data in which infrared images of a space constituted by a plurality of pixels and captured by the infrared camera at a plurality of times are arranged in time series.

In addition, the inspection image acquisition unit 211 may further acquire a gas temperature value of the space by measuring the temperature of the gas in the space with a temperature sensor or the like.

The image processing unit 212 includes a pixel specifying unit 2121, a without-gas background temperature estimation unit 2122, and a concentration-feature-quantity calculation unit 2123.

The pixel specifying unit 2121 is a circuit that specifies a target pixel of gas concentration measurement and a reference pixel with a gas concentration lower than that of the target pixel in the infrared image time-series data.

The pixel specifying unit 2121 may generate time-series data of a gas cloud image obtained by extracting an image of a gas cloud from the infrared image time-series data, and specify the target pixel and the reference pixel on the basis of the time-series data of the gas cloud image.

The generation of the time-series data of the gas cloud image can be used for a leaked gas visualization imaging device that visualizes gas leakage from a gas facility by capturing an infrared moving image of gas in the air using infrared absorption characteristics of the gas, for example, as described in a known document (for example, WO 2017/073430 A and JP 2012-58093 A).

The without-gas background temperature estimation unit 2122 is a circuit that estimates the without-gas background temperature time-series infrared data in the target pixel on the basis of the target pixel time-series infrared data in which the infrared data of the target pixel is arranged in time series and the reference pixel time-series infrared data in which the infrared data of the reference pixel is arranged in time series in the infrared image time-series data. The light absorption rate and the concentration length product, which are concentration feature quantities, are parameters that can be calculated by estimating a with-gas background temperature and a without-gas background temperature from the temporal change for each pixel as described in a known document, for example, Patent Literature 1.

The concentration-feature-quantity calculation unit 2123 is a circuit that calculates time-series data of the gas concentration feature quantity of the target pixel on the basis of the target pixel time-series infrared data and the without-gas background temperature time-series infrared data of the target pixel. As the gas concentration feature quantity, a light absorption rate or a gas concentration length product may be used. The light absorption rate is an absorption rate of light when gas is present in the space, and is represented by 0 to 1 where 0 indicates a state without gas. The light absorption rate can be converted into the concentration length product by the spectral absorption coefficient of the gas.

Details of the processing performed by the pixel specifying unit 2121, the without-gas background temperature estimation unit 2122, and the concentration-feature-quantity calculation unit 2123 in the image processing unit 212 will be described later.

The output unit 213 is a circuit that outputs the generated distribution image of the gas feature quantity to the communication circuit 22.

According to the gas concentration measuring device 20 with the above configuration, it is possible to more accurately estimate the background temperature when gas is not present by reducing the influence of a change in the background temperature due to a factor other than the gas with reference to the reference pixel (usually, without-gas pixel) in which the gas is faintly visible. Therefore, even in a case where the background temperature changes due to a factor other than the gas, the gas concentration feature quantity can be accurately estimated from the infrared moving image, and the gas concentration in the space can be accurately measured.

<Operation of Gas Concentration Measuring Device>

The following will describe the operation of the gas concentration measuring device 20 according to the present embodiment with reference to the drawings.

Figure 7:
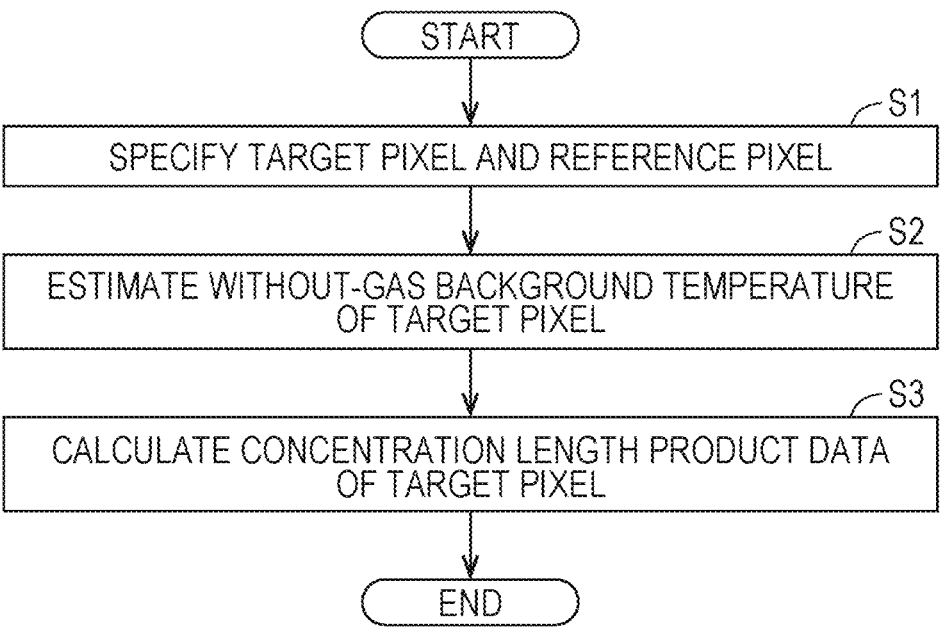
FIG. 7 is a flowchart illustrating a gas concentration measuring operation in the gas concentration measuring device 20.

FIG. 7 is a flowchart illustrating a gas concentration measuring operation performed by the control unit 21 in the gas concentration measuring device 20. In the following description, a method of estimating a concentration length product as a gas concentration feature quantity in gas concentration measurement for estimating the gas concentration feature quantity will be described.

As illustrated in FIG. 7, the gas concentration measuring device 20 according to the embodiment performs gas concentration measurement by sequentially performing specification of a target pixel and a reference pixel (step S1), estimation of a without-gas background temperature of the target pixel (step S2), and calculation of concentration length product data of the target pixel (step S3).

The individual operations in steps S1 to S3 will be described below.

(Specification of Target Pixel and Reference Pixel)

Next, a target pixel for gas concentration measurement and a reference pixel in which gas is not present (or gas is minute) are specified.

FIG. 8 is a flowchart illustrating an operation of specifying a target pixel and a reference pixel in step S1 in FIG. 7.

In an operation of selecting the target pixel and the reference pixel, first, infrared image time-series data acquired by the infrared camera 10 is acquired (step S11).

FIGS. 9(*a*) to 9(*d*) are examples illustrating modes of images of a plurality of frames arranged in time series based on the infrared image time-series data. In FIGS. 9(*a*) to 9(*d*), the ground is darkened due to the movement of the gas cloud, and the apparent temperature of the ground changes. The infrared image time-series data is an infrared image with the same format as the inspection data of an image generated by the infrared camera 10, and is a moving image including time-series data of a plurality of frames. The infrared image time-series data preferably has the number of frame pixels in which the number of vertical and horizontal pixels is a predetermined value. For example, the infrared image time-series data may have the number of vertical×horizontal pixels of 320×256 and N frames (N is a natural number) corresponding to 10 seconds at 10 frames per second (fps), for example, N may be about 100 frames.

Next, for example, specific frequency component image time-series data is generated on the basis of a known method described in WO 2017/073430 A (step S12), and difference time-series data between the infrared image time-series data and the specific frequency component image time-series data is generated (step S13).

In a frame corresponding to a gas emission period in the infrared image time-series data, the variations in the amplitude and waveform of the difference data increase.

Next, as data indicating the variation in the waveform of the difference data, moving standard deviation time-series data in units of a predetermined number of frames is generated and imaged for the difference time-series data (step S14). In the frame corresponding to the gas emission period, the variation in the amplitude of the moving standard deviation data remarkably increases, and the moving standard deviation time-series data changes the gas cloud image in the gas emission period.

Note that, in the processing of step S14, in addition to the moving standard deviation time series-data in units of a predetermined number of frames for the difference time-series data, the moving variance data of the difference data and the absolute-value added data of the difference data may be used as the data indicating the variation in the waveform of the difference data.

Figures 10A, 10B, 10C, 10D:
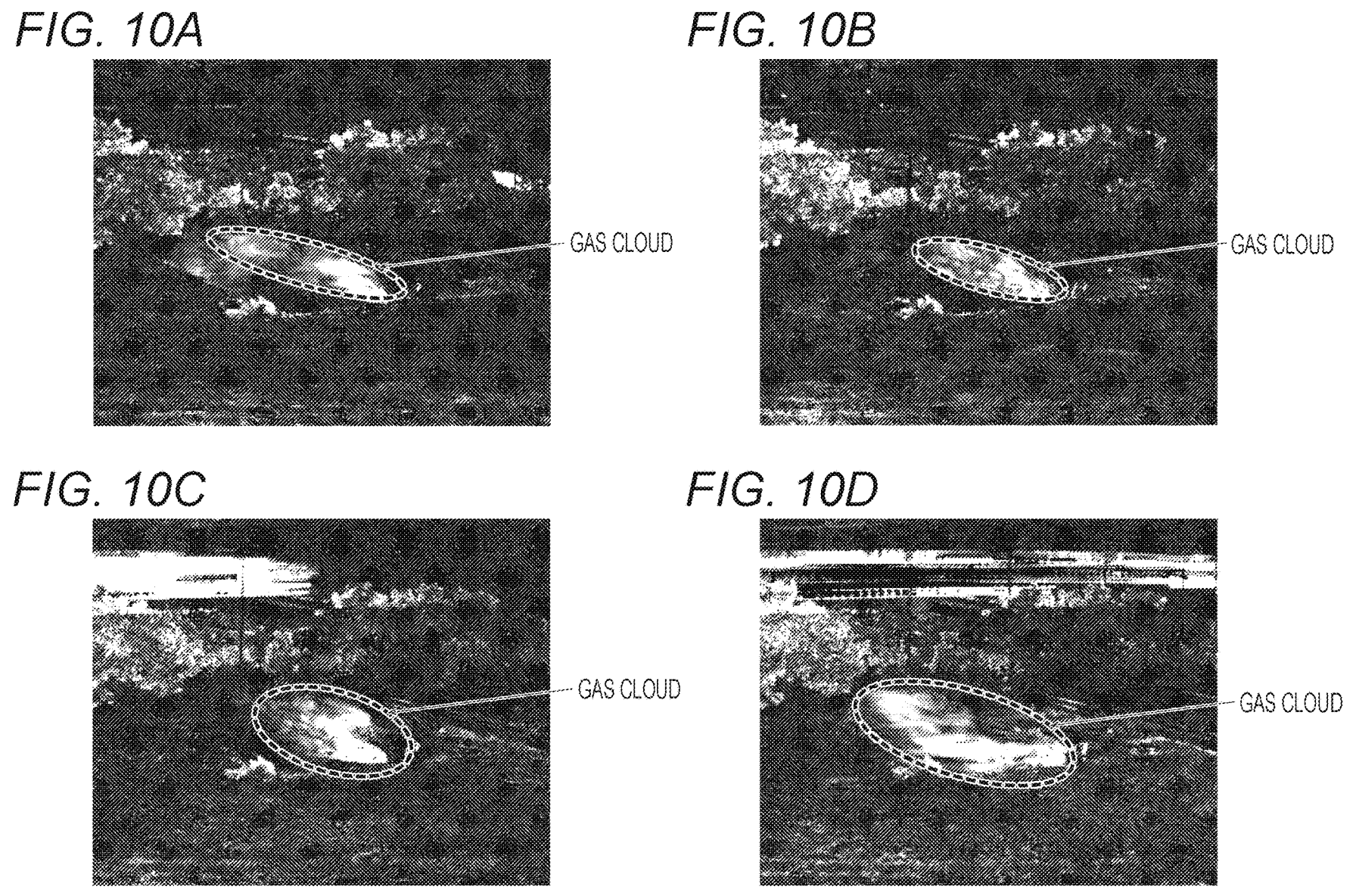

FIGS. 10(*a*) to 10(*d*) are examples of images of a plurality of frames arranged in time series based on time-series data of a gas cloud image. As illustrated in FIGS. 10(*a*) to 10(*d*), according to the gas cloud image, a portion of the gas cloud in the infrared image is emphasized, and it is possible to easily recognize a state where the gas cloud is moving.

Next, in order to determine the target pixel for gas concentration measurement, averaging processing is performed on the moving standard deviation time-series data (step S15). FIG. 11 illustrates an image obtained by averaging gas cloud images of the plurality of frames illustrated in FIGS. 10(*a*) to 10(*d*). As illustrated in FIG. 11, the portions where the portion of the gas cloud is present in FIGS. 10(*a*) to 10(*d*) are cumulatively displayed, and it is possible to easily recognize the range in which the gas cloud has moved.

Next, the target pixel is selected by threshold processing (step S16). In the threshold processing, as illustrated in FIG. 11, in the image obtained by averaging gas cloud images of a plurality of frames, the target pixel for gas concentration measurement is selected from pixels whose pixel data is equal to or more than a predetermined threshold. In the example illustrated in FIG. 11, the pixel indicated by the solid line circle on the left side in the drawing is set as the target pixel.

Here, in a case where there are a plurality of pixels whose pixel data is equal to or more than the predetermined threshold, all the candidates may be selected as target pixels, and the concentration length product may be calculated for each of the pixels. Alternatively, some pixels may be selected as target pixels from the plurality of pixels whose pixel data is equal to or more than the predetermined threshold. In this case, a pixel with the largest pixel value may be selected from the plurality of candidate pixels. Alternatively, a pixel surrounded by the plurality of pixels whose pixel value is equal to or more than the predetermined threshold may be selected as the target pixel.

Note that the method of searching for the target pixel is not limited to the above example. For example, it is also possible to adopt a method in which an operator designates the target pixel while viewing pixels.

Next, a method of selecting the reference pixel in which gas is not present (or gas is minute) will be described.

According to this example, in the processing of selecting the reference pixel on the basis of a temperature difference (step S17), as illustrated in FIG. 11, in the image obtained by averaging gas cloud images of a plurality of frames, the reference pixel for gas concentration measurement is selected from pixels with a temperature difference within a predetermined range with respect to the pixel data of the target pixel whose pixel data has been selected in step S1.

The reason for selecting a pixel with a temperature difference within the predetermined range is to assume the same material with a reflectance close to that of the target pixel. By assuming the same material with a reflectance close to that of the target pixel for the reference pixel, it is possible to improve accuracy in estimating the without-gas background temperature time-series infrared data in the target pixel on the basis of the reference pixel time-series infrared data in subsequent steps S24 and S25. In this example, the reference pixel is selected from pixels within a range of ±5° C. from the temperature of the target pixel.

In the example illustrated in FIG. 11, the pixel indicated by the broken line circle on the right side in FIG. 11, the pixel having a pixel value close to 0, is set as the target pixel, and a pixel in which almost no gas is present is selected as the reference pixel.

Here, in a case where there are a plurality of candidate reference pixels, the reference pixel value may be selected from pixels having a pixel value close to 0 (no gas is present or gas is minute) and close to the target pixel on the image.

Note that the method of searching for the reference pixel is not limited to the example of ±5° C. described above. Different temperature ranges may be set as long as the same material can be designated. Alternatively, the method in which the operator designates the reference pixel while viewing pixels may be adopted.

In this way, the operation of specifying the target pixel and the reference pixel is ended.

Furthermore, the processing may be repeatedly performed on the target pixel in the area where the gas is emitted. It is possible to specify the target pixel in the area where the gas is emitted and to specify the reference pixel for the target pixel.

(Estimation of Without-Gas Background Temperature of Target Pixel)

Next, the without-gas background temperature of the target pixel is estimated on the basis of the temperature change of the target pixel and the without-gas background temperature of the reference pixel.

FIG. 12 is a flowchart illustrating an operation of estimating the without-gas background temperature of the target pixel in step S2 in FIG. 6.

In the operation of estimating the without-gas background temperature of the target pixel, first, luminance value time-series data of the target pixel and the reference pixel is input (step S21), and converted into temperature value time-series data of the target pixel and the reference pixel (step S22). The conversion from the luminance value to the temperature value is performed on the basis of the luminance value-temperature value characteristic of the infrared camera 10.

Figure 13:
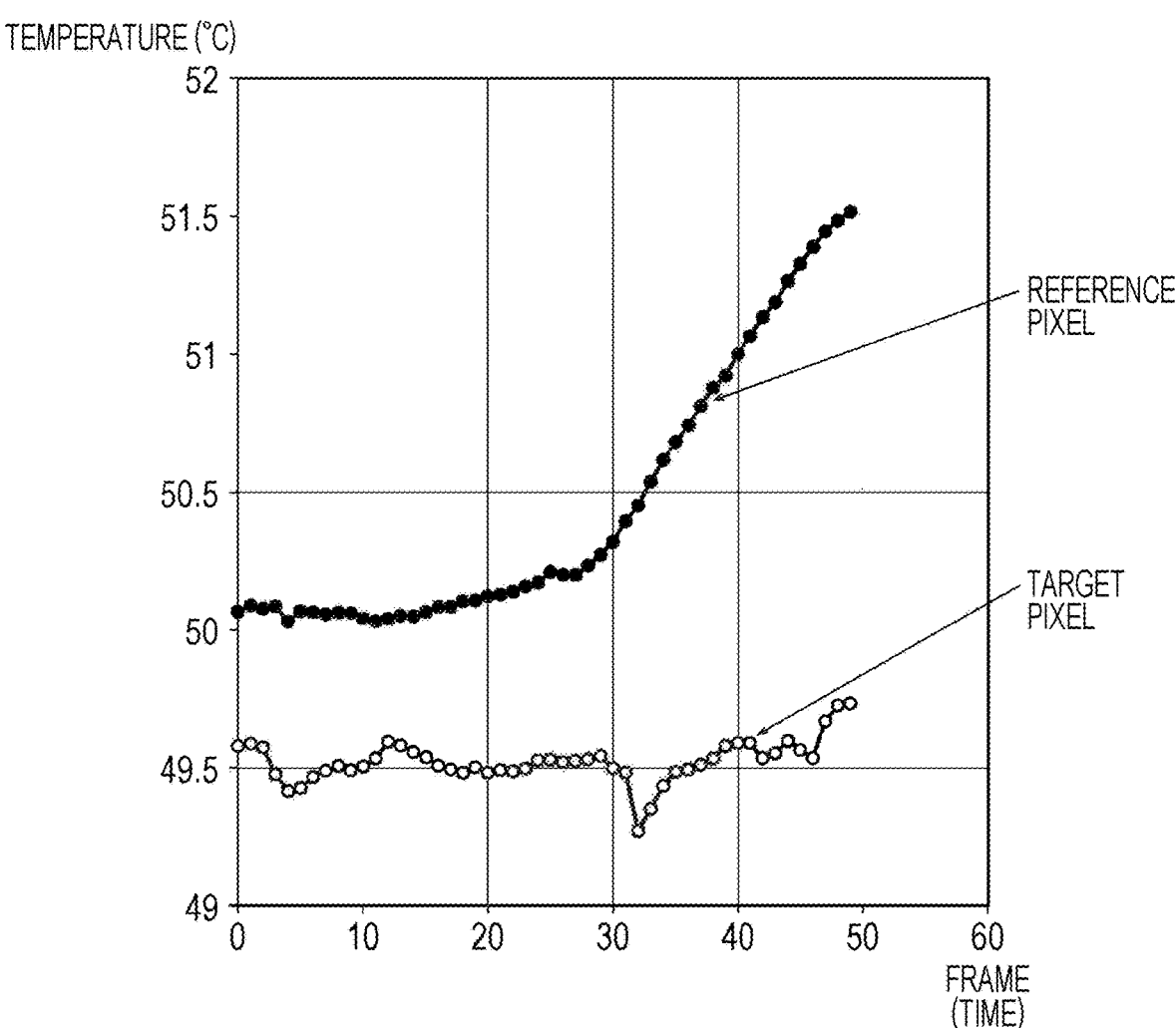
FIG. 13 is a diagram illustrating the outline of target pixel time-series infrared data and reference pixel time-series infrared data.

FIG. 13 is a diagram illustrating the outline of target pixel time-series infrared data and reference pixel time-series infrared data. In FIG. 13, the horizontal axis represents the frame number (1 to 50), and the vertical axis represents the temperature value. In the example illustrated in FIG. 13, it can be seen that the temperature of the reference pixel is higher than the temperature of the target pixel in all frames. It can be seen that the reference pixel indicating the without-gas background temperature has a smoother mode of temperature change than the target pixel indicating the gas temperature in the space.

Next, gas temperature value data is input (step S23). The gas temperature value is an average temperature of gas, and a value of a temperature obtained by actually measuring an environmental temperature in a space including a monitoring target by a temperature sensor can be used. In this example, the air temperature is 36.7° C., and the gas temperature acquired in step S23 is approximately 36.7° C. because the pixels diffused in the atmosphere adapt to the air temperature.

Next, in order to estimate the without-gas background temperature of the target pixel on the basis of the without-gas background temperature of the reference pixel, envelope processing is performed on the temperature value time-series data of the target pixel (step S24).

Figure 14:
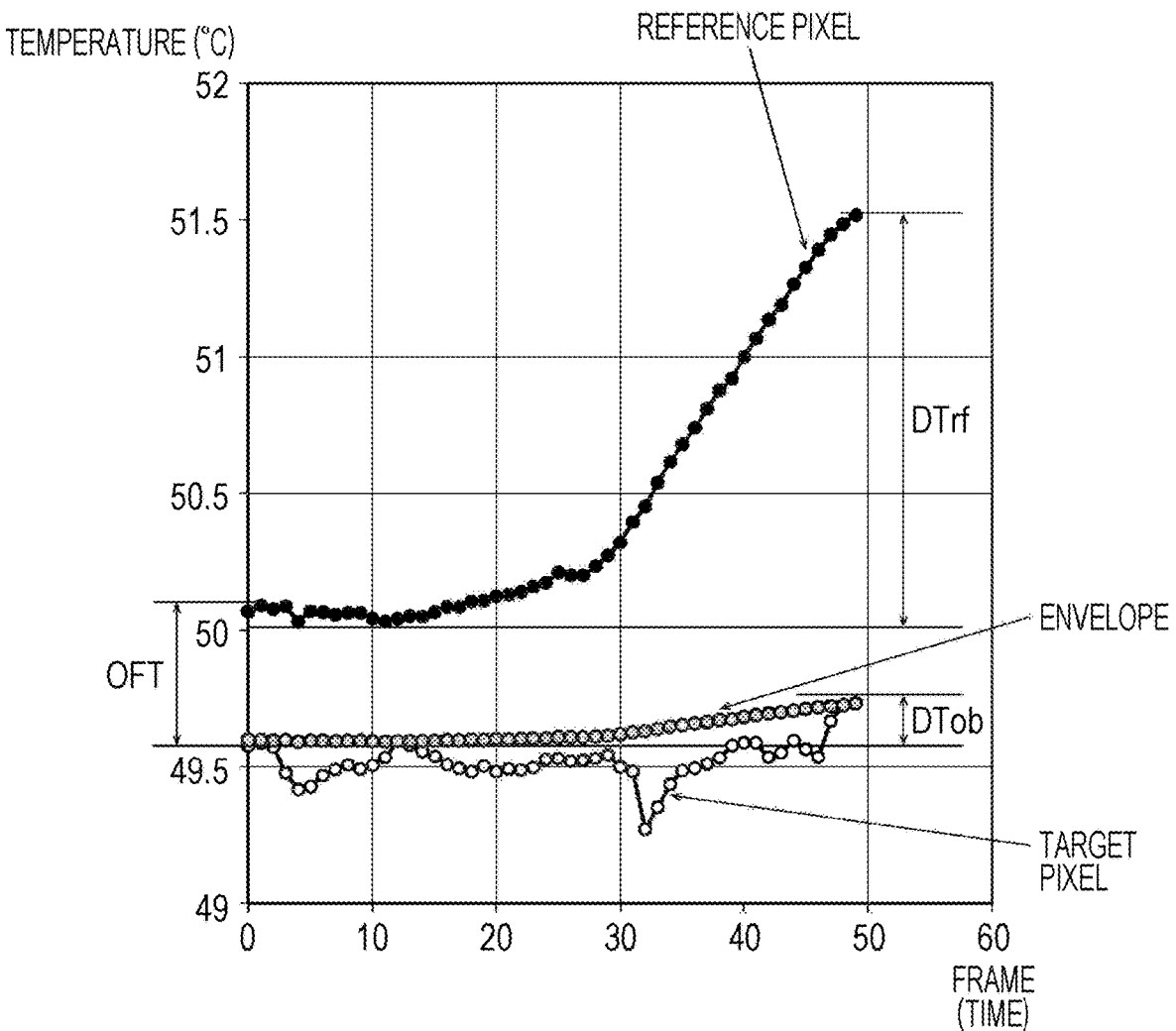
FIG. 14 is a diagram illustrating a mode of an envelope drawn in a manner that the sum of the areas of regions sandwiched between the target pixel time-series infrared data and the envelope is minimized.

FIG. 14 is a diagram illustrating a mode of a drawn envelope.

For example, as described in WO 2017/104617 A, the without-gas background temperature of the target pixel is an envelope with a larger temperature difference from a gas temperature out of two envelopes that can be drawn in the target pixel time-series infrared data. Therefore, in the example illustrated in FIG. 14, the without-gas background temperature of the target pixel is an upper envelope (on a higher temperature side).

On the other hand, since the temperature change is caused by a change in the cloud or the like, the shape of the temporal change in the without-gas background temperature of the reference pixel and the shape of the temporal change in the without-gas background temperature of the target pixel are considered to be similar. Therefore, the time-series data of the without-gas background temperature of the target pixel is estimated on the basis of the time-series data of the without-gas background temperature of the reference pixel (reference pixel time-series infrared data).

Specifically, the time-series data of the envelope is calculated by performing the following processing in a manner that the area surrounded by the without-gas background temperature (envelope) of the target pixel and the target pixel time-series infrared data is minimized.

The envelope is calculated by offsetting the without-gas background temperature time-series data of the reference pixel (reference pixel time-series infrared data) by a coefficient OFT (offset coefficient $0 \leq OFT \leq 1$) from the temperature value (offset coefficient of 0) of the reference pixel with the frame 0 to the temperature value (offset coefficient of 1)

of the target pixel so as to approach the target pixel time-series infrared data, multiplying the without-gas background temperature time-series data of the reference pixel by a coefficient K ($0 \leq K \leq 1$) for reducing a temperature change amount, and changing the offset value OFT and the coefficient K in a manner that the sum of the areas of the regions sandwiched between the target pixel time-series infrared data and the reference pixel time-series data in which the temperature change amount is reduced and the temperature value is offset is minimized.

Next, the obtained envelope is estimated as the without-gas background temperature time-series data of the target pixel and output (step S25).

In this way, the operation of estimating the without-gas background temperature of the target pixel is ended.

Furthermore, the processing may be repeatedly performed on the target pixel in the area where the gas is emitted. The without-gas background temperature of the target pixel in the area where the gas is emitted can be estimated.

(Calculation of Concentration Length Product Data of Target Pixel)

Next, the concentration length product of the target pixel is estimated on the basis of the temperature change of the target pixel and the estimated without-gas background temperature of the target pixel.

Figure 15:
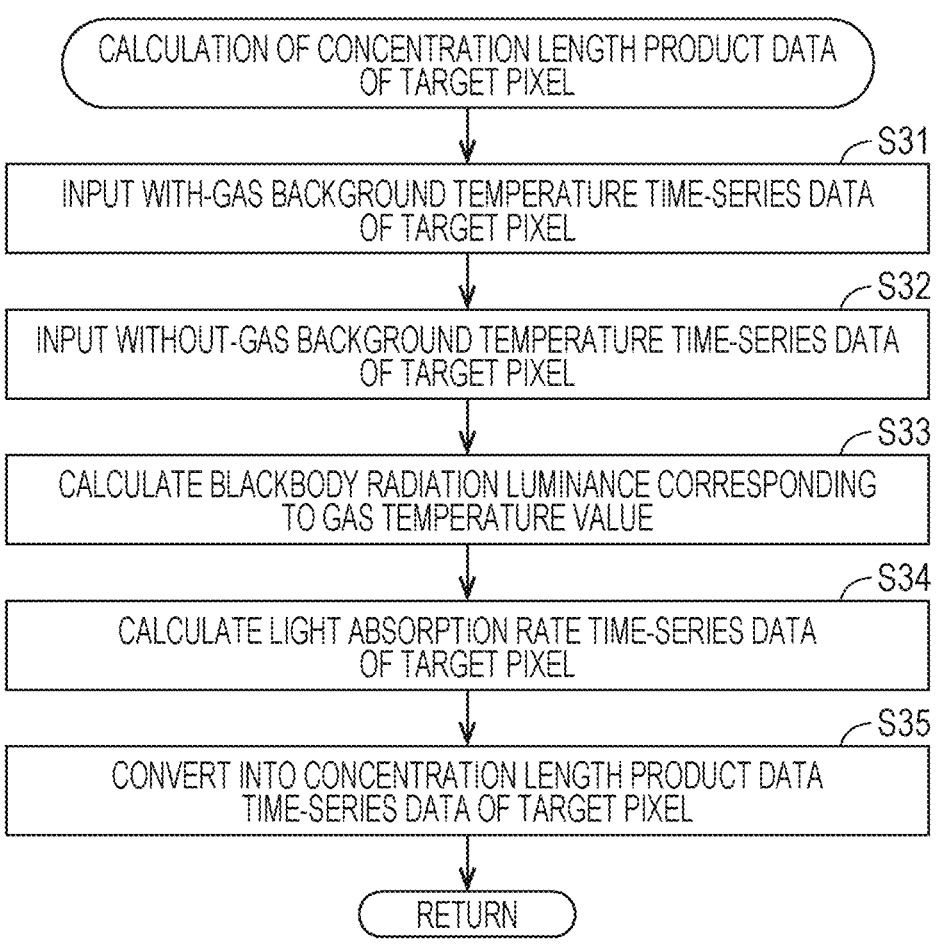
FIG. 15 is a flowchart illustrating an operation of calculating concentration length product data of the target pixel in step S3 in FIG. 7.

FIG. 15 is a flowchart illustrating an operation of calculating the concentration length product data of the target pixel in step S3 in FIG. 7.

In the operation of calculating the concentration length product data of the target pixel, first, the with-gas background temperature time-series data of the target pixel (target pixel time-series infrared data) is input (step S31). Next, the without-gas background temperature time-series data of the target pixel is input (step S32), and the blackbody radiation luminance corresponding to the gas temperature value at each time is calculated on the basis of a known method (step S33).

Next, the light absorption rate time-series data of the target pixel is calculated (step S34), and the time-series data of a light absorption rate image is generated.

Figures 16A, 16B, 16C:
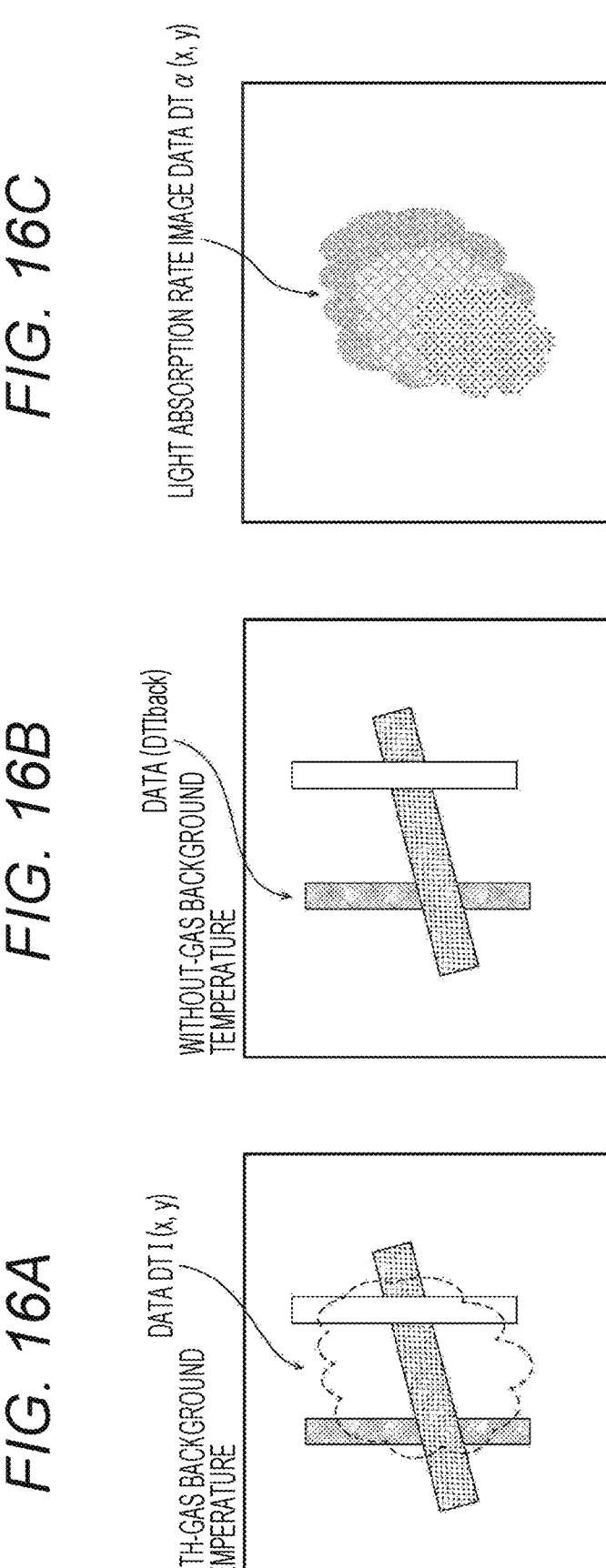
FIG. 16(*a*) is a schematic diagram illustrating the outline of with-gas background temperature data, FIG. 16(*b*) is a schematic diagram illustrating the outline of without-gas background temperature data, and FIG. 16(*c*) is a schematic diagram illustrating the outline of light absorption rate image data.

FIG. 16(a) is a schematic diagram illustrating the outline of with-gas background temperature data, FIG. 16(b) is a schematic diagram illustrating the outline of without-gas background temperature data, and FIG. 16(c) is a schematic diagram illustrating the outline of light absorption rate image data.

Assuming that the coordinates of the target pixel is (x, y), the infrared intensity of the target pixel at the without-gas background temperature is DTIback(x, y), the blackbody radiation luminance corresponding to the gas temperature is Igas, and the infrared intensity of the target pixel is DTI(x, y), the value $DT\alpha(x, y)$ of the light absorption rate of the light absorption rate image in the target pixel is calculated by Formula 1 on the basis of a known method described in WO 2017/104607, for example.

[Mathematical Formula 1]

$$DT\alpha(x, y) = \frac{DTI(x, y) - DTI_{back}(x, y)}{I_{gas} - DTI_{back}(x, y)} \qquad \text{(Formula 1)}$$

Next, the light absorption rate of the target pixel is converted from the time-series data of the obtained light absorption rate image into concentration length product data time-series data (step S35).

Figure 17:
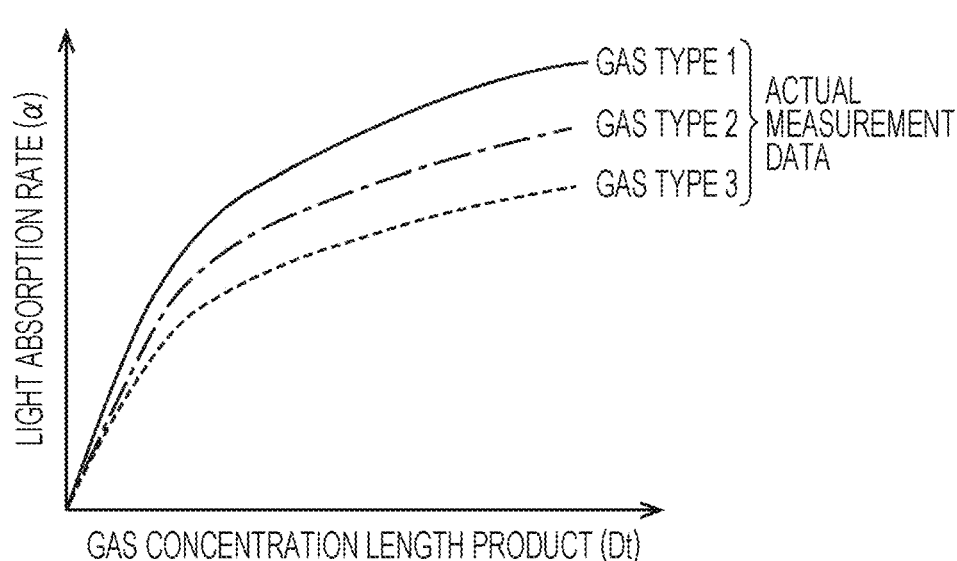
FIG. 17 is a schematic diagram for explaining the outline of a method of calculating the concentration length product from the light absorption rate.

FIG. 17 is a schematic diagram for explaining the outline of a method of calculating the concentration length product from the light absorption rate.

For the concentration length product, the gas concentration length product corresponding to the value of the light absorption rate in the target pixel (x, y) is calculated using the relationship between the gas concentration length product and the light absorption rate illustrated in FIG. 17. The light absorption rate varies depending on the designated gas type, and the light absorption rate of the light absorption rate image data is converted into the gas concentration length product image data on the basis of the relationship data between the value of the concentration length product and the light absorption rate, for example, the value of the light absorption rate corresponding to the gas concentration length product stored in a data table or the like, a mathematical expression representing an approximate curve, or the like. The relationship between the gas concentration length product and the light absorption rate for each gas type may be acquired in advance by actual measurement.

In this way, the operation of calculating the concentration length product data of the target pixel is ended.

Furthermore, the processing may be repeatedly performed on the target pixel in the area where the gas is emitted. It is possible to estimate the concentration length product of the area where the gas is emitted.

(Effects)

As described above, the gas concentration measuring device 20 according to the embodiment includes the inspection image acquisition unit 211 that acquires the infrared image time-series data captured by the infrared camera 10, the pixel specifying unit 2121 that specifies the target pixel for gas concentration measurement and the reference pixel with a gas concentration lower than that of the target pixel in the infrared image, the without-gas background temperature estimation unit 2122 that estimates the without-gas background temperature time-series infrared data in the target pixel on the basis of the target pixel time-series infrared data and the reference pixel time-series infrared data in the infrared image time-series data, and the concentration-feature-quantity calculation unit 2123 that calculates the time-series data of the gas concentration feature quantity of the target pixel on the basis of the target pixel time-series infrared data and the without-gas background temperature time-series infrared data of the target pixel.

With this configuration, the without-gas background temperature of the target pixel can be estimated from the temporal change in the temperature of the reference pixel in which no gas is emitted (or the gas concentration is low), and the concentration length product of the target pixel to be inspected can be estimated.

As a result, since the change in the background temperature of the target pixel is estimated with reference to the pixel data in the reference pixel (usually, without-gas pixel) in which the gas is faintly visible, it is possible to accurately estimate the concentration length product even in a case where the background temperature changes due to a factor other than the gas.

As a result, the accuracy of the measurement result of the concentration length product in a case where the background temperature changes due to a factor other than the gas can be improved as compared with the conventional technique of estimating the without-gas background temperature of the target pixel using the fact that the with-gas and without-gas data is imaged in time series for the inspection target pixel.

Summary

A gas concentration measuring device according to one aspect of the present disclosure is a gas concentration measuring device that measures a distribution of a gas concentration in a space exposed from a gas leakage monitoring target, the gas concentration measuring device including:

an inspection image acquisition unit that acquires infrared image time-series data in which infrared images captured by an infrared camera at a plurality of times and capturing the space constituted by a plurality of pixels are arranged in time series;

a pixel specifying unit that specifies a target pixel for gas concentration measurement and a reference pixel with a gas concentration lower than a gas concentration of the target pixel in the gas cloud image;

a without-gas background temperature estimation unit that estimates without-gas background temperature time-series infrared data in the target pixel based on target pixel time-series infrared data in which infrared data of the target pixel is arranged in time series and reference pixel time-series infrared data in which infrared data of the reference pixel is arranged in time series in time-series data of the infrared image; and a concentration-feature-quantity calculation unit that calculates time-series data of a feature quantity related to a gas concentration of the target pixel based on the target pixel time-series infrared data and without-gas background temperature time-series infrared data of the target pixel.

With such a configuration, it is possible to more accurately estimate the background temperature when the gas is not present by reducing the influence of a change in the background temperature due to a factor other than the gas. Therefore, even in a case where the background temperature changes due to a factor other than the gas, the gas concentration in the space can be accurately detected from the infrared moving image.

Furthermore, according to another aspect, in any one of the above aspects, the pixel specifying unit may be configured to generate time-series data of a gas cloud image obtained by extracting an image of a gas cloud from time-series data of the infrared image, and specify the target pixel and the reference pixel based on time-series data of the gas cloud image.

With such a configuration, according to the gas cloud image, the portion of the gas cloud in the infrared image is emphasized, and it is possible to easily specify the target pixel for gas concentration measurement and the reference pixel in which the gas is not present (or the gas is minute).

Furthermore, according to still another aspect, in any one of the above aspects, time-series data of the gas cloud image may be configured to be time-series data of an image obtained by extracting a temporal change in a specific frequency component from time-series data of the infrared image.

With such a configuration, it is possible to generate the gas cloud image by emphasizing the portion of the space in which the gas is present using frequency characteristics related to gas fluctuation in the space.

Furthermore, according to still another aspect, in any one of the above aspects, the infrared image may be configured to include data indicating a luminance or a temperature.

With such a configuration, even in a case where the luminance value is used as the infrared image, it is possible to estimate a feature quantity related to the gas concentration as in a case where the temperature value is used.

Furthermore, according to still another aspect, in any one of the above aspects, the pixel specifying unit may be configured to select the reference pixel from pixels with a value of an infrared image within a predetermined range with respect to the target pixel.

With such a configuration, the same material with a reflectance close to that of the target pixel can be assumed for the reference pixel, and it is possible to improve the accuracy in estimating the without-gas background temperature time-series infrared data in the target pixel on the basis of the reference pixel time-series infrared data.

Furthermore, according to still another aspect, in any one of the above aspects, the without-gas background temperature estimation unit may be configured to estimate the without-gas background temperature time-series infrared data in the target pixel by drawing, for the target pixel time-series infrared data, an envelope in a manner that a sum of areas of regions sandwiched between the target pixel time-series infrared data and the envelope is minimized.

With such a configuration, it is possible to estimate the without-gas background temperature time-series infrared data in the target pixel on the basis of the target pixel time-series infrared data and the reference pixel time-series infrared data in which the infrared data of the reference pixel is arranged in time series.

Furthermore, according to still another aspect, in any one of the above aspects, the envelope may be configured to be a line obtained by changing a change amount and/or an offset value of the reference pixel time-series infrared data.

With such a configuration, it is possible to perform the processing of drawing an envelope on the target pixel time-series infrared data in a manner that the sum of the areas of the regions sandwiched between the target pixel time-series infrared data and the envelope is minimized.

Furthermore, according to still another aspect, in any one of the above aspects, the envelope may be configured to be an envelope with a larger temperature difference from a gas temperature in the space out of two envelopes that can be drawn in target pixel time-series infrared data.

With such a configuration, it is possible to perform processing of estimating the without-gas background temperature time-series infrared data in the target pixel on the basis of the reference pixel time-series infrared data.

Alternatively, a gas concentration measuring device according to one aspect of the present disclosure is a gas concentration measuring device that measures a distribution of a gas concentration in a space as a monitoring target, the gas concentration measuring device including: an inspection image acquisition unit that acquires infrared image time-series data in which infrared images captured by an infrared camera at a plurality of times and capturing the space constituted by a plurality of pixels are arranged in time series; a pixel specifying unit that specifies a target pixel for gas concentration measurement and a reference pixel with a gas concentration lower than a gas concentration of the target pixel in the infrared image; and a concentration-feature-quantity calculation unit that calculates a feature quantity related to a gas concentration of the target pixel based on target pixel temperature information including a temperature change of target pixel time-series infrared data in which infrared data of the target pixel is arranged in time series and reference pixel temperature information including a temperature change of reference pixel time-series infrared data in which infrared data of the reference pixel is arranged in time series in time-series data of the infrared image.

With such a configuration, by using the temperature change information of the reference pixel, it is possible to reduce the influence of the change in the background temperature and to more accurately estimate the background temperature when the gas is not present.

Furthermore, according to another aspect, there may be provided a gas concentration measuring method of measuring a distribution of a gas concentration in a space exposed from a gas leakage monitoring target, the gas concentration measuring method including:

acquiring infrared image time-series data in which infrared images captured by an infrared camera at a plurality of times and capturing the space constituted by a plurality of pixels are arranged in time series;

specifying a target pixel for gas concentration measurement and a reference pixel with a gas concentration lower than a gas concentration of the target pixel in the infrared image;

estimating without-gas background temperature time-series infrared data in the target pixel based on target pixel time-series infrared data in which infrared data of the target pixel is arranged in time series and reference pixel time-series infrared data in which infrared data of the reference pixel is arranged in time series in time-series data of the infrared image; and calculating time-series data of a feature quantity related to a gas concentration of the target pixel based on target pixel time-series infrared data and without-gas background temperature time-series infrared data of the target pixel.

Furthermore, according to another aspect, there may be provided a program that causes a computer to perform gas concentration measuring processing of measuring a distribution of a gas concentration in a space exposed from a gas leakage monitoring target, wherein the gas concentration measuring processing includes acquiring infrared image time-series data in which infrared images captured by an infrared camera at a plurality of times and capturing the space constituted by a plurality of pixels are arranged in time series, specifying a target pixel for gas concentration measurement and a reference pixel with a gas concentration lower than a gas concentration of the target pixel in the infrared image, estimating without-gas background temperature time-series infrared data in the target pixel based on target pixel time-series infrared data in which infrared data of the target pixel is arranged in time series and reference pixel time-series infrared data in which infrared data of the reference pixel is arranged in time series in time-series data of the infrared image, and calculating time-series data of a feature quantity related to a gas concentration of the target pixel based on the target pixel time-series infrared data and without-gas background temperature time-series infrared data of the target pixel.

Modifications

Although the gas concentration measuring system 1 according to the embodiment has been described above, the present disclosure is not limited to the above embodiment except for essential characteristic constituent elements thereof. For example, the present disclosure also includes a mode obtained by applying various modifications conceived by those skilled in the art to the embodiments, and a mode achieved by arbitrarily combining constituent elements and functions of the embodiments without departing from the gist of the present invention. The following will describe modifications of the above embodiment as examples of such a mode.

(1) In the embodiment described above, the without-gas background temperature estimation unit is configured to estimate the without-gas background temperature time-series infrared data in the target pixel by drawing, for the target pixel time-series infrared data, an envelope in a manner that the sum of the areas of the regions sandwiched between the target pixel time-series infrared data and the envelope is minimized. However, as a modification, the without-gas background temperature estimation unit may be configured to estimate the without-gas background temperature time-series infrared data in the target pixel using a machine learning model.

In this case, the machine learning model used in the without-gas background temperature estimation unit may be, for example, a model in which machine learning is performed by using, as training data, the reference pixel time-series infrared data, the target pixel time-series infrared data, and the without-gas background temperature time-series infrared data of the target pixel, which is correct answer data, or a configuration in which the without-gas background temperature time-series infrared data of the target pixel is output when the reference pixel time-series infrared data and the target pixel time-series infrared data is input to the machine learning model.

At this time, since the feature quantities (concentration length product and light absorption rate) related to the gas concentration of the target pixel are analytically obtained by the without-gas background temperature of the target pixel, the temperature data (with-gas background temperature) of the target pixel, and the air temperature, a machine learning model may be generated using, as the training data, the reference pixel time-series infrared data, the target pixel time-series infrared data, air temperature data, and the time-series data of the feature quantity related to the gas concentration of the target pixel, which is the correct answer data, and the time-series data of the feature quantity related to the gas concentration of the target pixel may be calculated using this machine learning model.

Furthermore, the calculated feature quantity related to the gas concentration of the target pixel is not limited to the time-series data, and may be an average value. In this case, instead of the time-series data of the feature quantity related to the gas concentration of the target pixel as the correct answer data, the average value of the feature quantities related to the gas concentration of the target pixel may be learned as the correct answer data.

(2) In the above embodiment, the configuration of using the infrared image captured by the infrared camera 10 as the inspection image to be inspected has been introduced, and the embodiment has been described as an example of using data indicating the temperature value as the pixel data of the infrared image.

However, it is needless to mention that the mode of the pixel data constituting the infrared image as the inspection image is not limited to thereto, and for example, it is possible to adopt a method of processing a luminance value obtained from an infrared sensor as it is (before converting the luminance value into a temperature value).

(3) In the above embodiment, the description has been given of the configuration in which the reference pixel is selected from the pixels in the range between the temperature of the target pixel and a predetermined temperature in the method of selecting the reference pixel in which the gas is not present (or the gas concentration is low).

However, it is needless to mention that it is not limited to the method for selecting the reference pixel, and for example, as described in JP 2012-58093 A, it is possible to adopt the method of calculating the absolute value of the luminance change and adding the absolute values one after another.

(4) In the above embodiment, the embodiment has been described by exemplifying the configuration in which the gas concentration length product is estimated as the gas concentration feature quantity in the gas concentration measurement for estimating the gas concentration feature quantity. However, the light absorption rate may be estimated as the gas concentration measurement instead of the gas concentration length product.

(5) In the above embodiment, the description is given by exemplifying the gas plant as the gas facility as an example of the image to be inspected. However, the present disclosure is not limited thereto, and may be applied to generation of the display images in apparatuses, devices, laboratories, research institutes, factories, or offices using gases.

(6) Although the present disclosure has been described on the basis of the above embodiment, the present disclosure is not limited to the above embodiment, and the following cases are also included in the present invention.

For example, the present invention may be a computer system including a microprocessor and a memory, in which the memory stores the computer program, and the microprocessor operates according to the computer program. For example, it may be the computer system having the computer program of processing in the system of the present disclosure or the constituent element thereof, and operating according to the program (or instructing each connected part to operate).

The present invention also includes the case where all or a part of the processing in the system or the constituent elements thereof is configured by the computer system including the microprocessor, a recording medium such as a ROM or a RAM, a hard disk unit, and the like. The RAM or the hard disk unit stores the computer program for achieving the same operation as each of the above devices. The microprocessor operates in accordance with the computer program, whereby each device achieves its function.

In addition, some or all of the constituent elements constituting each of the devices described above may be constituted by one system large scale integration (LSI). The system LSI is a super multifunctional LSI manufactured by integrating a plurality of components on one chip, and is specifically the computer system including the microprocessor, the ROM, the RAM, and the like. These may be individually integrated into one chip, or may be integrated into one chip so as to include a part or all of them. The RAM stores the computer program for achieving the same operation as each of the above devices. The microprocessor operates in accordance with the computer program, whereby the system LSI achieves its functions. For example, the present invention also includes the case where processing in the system or the constituent element thereof is stored as an LSI program, the LSI is inserted into the computer, and a predetermined program is executed.

The circuit integration method is not limited to LSI, and may be implemented by a dedicated circuit or a general-purpose processor. A field programmable gate array (FPGA) that can be programmed after manufacturing of the LSI or a reconfigurable processor in which connections and settings of circuit cells inside the LSI can be reconfigured may be used.

Further, when a circuit integration technology replacing the LSI appears due to the progress of the semiconductor technology or another derived technology, the functional blocks may be integrated using the technology.

In addition, some or all of the functions of the system or the constituent elements thereof according to each embodiment may be implemented by a processor such as the CPU executing the program. This may be a non-transitory computer-readable recording medium in which the program for implementing the operation of the system or the constituent elements thereof is recorded. The program or signal may be recorded on a recording medium and transferred, so that the program can be implemented by another independent computer system. Furthermore, it goes without saying that the program can be distributed via a transmission medium such as the Internet.

In addition, the system or each constituent element thereof according to the above embodiment may be configured to be implemented by a programmable device such as the CPU, the graphics processing unit (GPU), or the processor, and software. These constituent elements can be one circuit component, or can be an assembly of a plurality of circuit components. In addition, a plurality of components can be combined to form one circuit component, or can be an assembly of a plurality of circuit components.

(7) The division of the functional blocks is an example, and a plurality of functional blocks may be implemented as one functional block, one functional block may be divided into a plurality of functional blocks, or some functions may be transferred to another functional block. In addition, functions of a plurality of functional blocks having similar functions may be processed in parallel or in a time division manner by single hardware or software.

In addition, the order in which the above steps are executed is for specifically describing the present invention, and may be a different order from the above. In addition, some of the above steps may be executed simultaneously (in parallel) with other steps.

In addition, at least some of the functions of the embodiments and the modifications thereof may be combined. Furthermore, the numbers used above are all exemplified to specifically describe the present invention, and the present invention is not limited to the exemplified numbers.

Supplement

Each of the embodiments described above explains a preferred specific example of the present invention. Numerical values, shapes, materials, constituent elements, arrangement positions and connection forms of the constituent elements, steps, order of the steps, and the like described in the embodiments are merely examples, and are not intended to limit the present invention. Furthermore, among the constituent elements in the embodiments, a step not described in an independent claim indicating the most generic concept of the present invention will be described as an arbitrary constituent element constituting a more preferable mode.

In addition, in order to facilitate understanding of the invention, scales of constituent elements in the drawings described in each of the above embodiments may be different from actual scales. In addition, the present invention is not limited by the description of each embodiment described above, and can be appropriately changed without departing from the gist of the present invention.

Furthermore, although members such as circuit components and lead wires are also present on a substrate, various aspects of electrical wiring and electrical circuits can be implemented based on common knowledge in the art, and descriptions of these are not made because they are not directly relevant. Each of the drawings described above is a schematic diagram, and is not necessarily strictly illustrated.

INDUSTRIAL APPLICABILITY

The gas concentration measuring device, the gas concentration measuring method, and the program according to the present disclosure are widely applicable to gas concentration estimation using an infrared imaging device.

REFERENCE SIGNS LIST 1 gas concentration measuring system
10 infrared camera
11 lens
12 filter
13 imaging element
14 signal processing unit
20 gas concentration measuring device
21 control unit
211 inspection image acquisition unit
212 image processing unit
2121 pixel specifying unit
2122 without-gas background temperature estimation unit
2123 concentration-feature-quantity calculation unit
213 output unit
22 communication circuit
23 storage device
24 display
25 operation input unit
30 storage unit

The invention claimed is:

1. A gas concentration measuring device that measures a distribution of a gas concentration in a space as a monitoring target, the gas concentration measuring device comprising:

an inspection image acquisitor that acquires infrared image time-series data in which infrared images captured by an infrared camera at a plurality of times and capturing the space constituted by a plurality of pixels are arranged in time series;

a pixel specifier that specifies a target pixel for gas concentration measurement and a reference pixel with a gas concentration lower than a gas concentration of the target pixel in the infrared image;

a without-gas background temperature estimator that estimates without-gas background temperature time-series infrared data in the target pixel based on target pixel time-series infrared data in which infrared data of the target pixel is arranged in time series and reference pixel time-series infrared data in which infrared data of the reference pixel is arranged in time series in time-series data of the infrared image; and a concentration-feature-quantity calculator that calculates time-series data of a feature quantity related to a gas concentration of the target pixel based on the target pixel time-series infrared data and without-gas background temperature time-series infrared data of the target pixel.

2. The gas concentration measuring device according to claim 1, wherein the pixel specifier generates time-series data of a gas cloud image obtained by extracting an image of a gas cloud from time-series data of the infrared image, and specifies the target pixel and the reference pixel based on time-series data of the gas cloud image.

3. The gas concentration measuring device according to claim 2, wherein time-series data of the gas cloud image is time-series data of an image obtained by extracting a temporal change in a specific frequency component from time-series data of the infrared image.

4. The gas concentration measuring device according to claim 3, wherein the without-gas background temperature estimator estimates the without-gas background temperature time-series infrared data in the target pixel by drawing, for the target pixel time-series infrared data, an envelope in a manner that a sum of areas of regions sandwiched between the target pixel time-series infrared data and the envelope is minimized.

5. The gas concentration measuring device according to claim 2, wherein the without-gas background temperature estimator estimates the without-gas background temperature time-series infrared data in the target pixel by drawing, for the target pixel time-series infrared data, an envelope in a manner that a sum of areas of regions sandwiched between the target pixel time-series infrared data and the envelope is minimized.

6. The gas concentration measuring device according to claim 1, wherein the infrared image includes data indicating a luminance or a temperature.

7. The gas concentration measuring device according to claim 6, wherein the without-gas background temperature estimator estimates the without-gas background temperature time-series infrared data in the target pixel by drawing, for the target pixel time-series infrared data, an envelope in a manner that a sum of areas of regions sandwiched between the target pixel time-series infrared data and the envelope is minimized.

8. The gas concentration measuring device according to claim 1, wherein the pixel specifier selects the reference pixel from pixels with a value of an infrared image within a predetermined range with respect to the target pixel.

9. The gas concentration measuring device according to claim 8, wherein the without-gas background temperature estimator estimates the without-gas background temperature time-series infrared data in the target pixel by drawing, for the target pixel time-series infrared data, an envelope in a manner that a sum of areas of regions sandwiched between the target pixel time-series infrared data and the envelope is minimized.

10. The gas concentration measuring device according to claim 1, wherein the without-gas background temperature estimator estimates the without-gas background temperature time-series infrared data in the target pixel by drawing, for the target pixel time-series infrared data, an envelope in a manner that a sum of areas of regions sandwiched between the target pixel time-series infrared data and the envelope is minimized.

11. The gas concentration measuring device according to claim 10, wherein the envelope is a line obtained by changing a change amount and/or an offset value of the reference pixel time-series infrared data.

12. The gas concentration measuring device according to claim 10, wherein the envelope is an envelope with a larger temperature difference from a gas temperature in the space out of two envelopes that can be drawn in target pixel time-series infrared data.

13. The gas concentration measuring device according to claim 11, wherein the envelope is an envelope with a larger temperature difference from a gas temperature in the space out of two envelopes that can be drawn in target pixel time-series infrared data.

14. A gas concentration measuring device that measures a distribution of a gas concentration in a space as a monitoring target, the gas concentration measuring device comprising:

an inspection image acquisitor that acquires infrared image time-series data in which infrared images captured by an infrared camera at a plurality of times and capturing the space constituted by a plurality of pixels are arranged in time series;

a pixel specifier that specifies a target pixel for gas concentration measurement and a reference pixel with a gas concentration lower than a gas concentration of the target pixel in the infrared image; and a concentration-feature-quantity calculator that calculates a feature quantity related to a gas concentration of the target pixel based on target pixel temperature information including a temperature change of target pixel time-series infrared data in which infrared data of the target pixel is arranged in time series and reference pixel temperature information including a temperature change of reference pixel time-series infrared data in which infrared data of the reference pixel is arranged in time series in time-series data of the infrared image.

15. A gas concentration measuring method of measuring a distribution of a gas concentration in a space as a monitoring target, the gas concentration measuring method comprising:

acquiring infrared image time-series data in which infrared images captured by an infrared camera at a plurality of times and capturing the space constituted by a plurality of pixels are arranged in time series;

specifying a target pixel for gas concentration measurement and a reference pixel with a gas concentration lower than a gas concentration of the target pixel in the infrared image;

estimating without-gas background temperature time-series infrared data in the target pixel based on target pixel time-series infrared data in which infrared data of the target pixel is arranged in time series and reference pixel time-series infrared data in which infrared data of the reference pixel is arranged in time series in time-series data of the infrared image; and calculating time-series data of a feature quantity related to a gas concentration of the target pixel based on target pixel time-series infrared data and without-gas background temperature time-series infrared data of the target pixel.

16. The gas concentration measuring method according to claim 15, wherein in specifying the target pixel and the reference pixel, time-series data of a gas cloud image obtained by extracting an image of a gas cloud from time-series data of the infrared image is generated, and the target pixel and the reference pixel are specified based on time-series data of the gas cloud image.

17. The gas concentration measuring method according to claim 16, wherein in estimating the without-gas background temperature, the without-gas background temperature time-series infrared data in the target pixel is estimated by drawing, for the target pixel time-series infrared data, an envelope in a manner that a sum of areas of regions sandwiched between the target pixel time-series infrared data and the envelope is minimized.

18. The gas concentration measuring method according to claim 15, wherein in estimating the without-gas background temperature, the without-gas background temperature time-series infrared data in the target pixel is estimated by drawing, for the target pixel time-series infrared data, an envelope in a manner that a sum of areas of regions sandwiched between the target pixel time-series infrared data and the envelope is minimized.

19. A non-transitory recording medium storing a computer readable program that causes a computer to perform gas concentration measuring processing of measuring a distribution of a gas concentration in a space as a monitoring target, wherein the gas concentration measuring processing includes acquiring infrared image time-series data in which infrared images captured by an infrared camera at a plurality of times and capturing the space constituted by a plurality of pixels are arranged in time series, specifying a target pixel for gas concentration measurement and a reference pixel with a gas concentration lower than a gas concentration of the target pixel in the infrared image, estimating without-gas background temperature time-series infrared data in the target pixel based on target pixel time-series infrared data in which infrared data of the target pixel is arranged in time series and reference pixel time-series infrared data in which infrared data of the reference pixel is arranged in time series in time-series data of the infrared image, and calculating time-series data of a feature quantity related to a gas concentration of the target pixel based on target pixel time-series infrared data and without-gas background temperature time-series infrared data of the target pixel.

* * * * *